United States Patent [19]
Carlstrom

[11] 3,953,140
[45] Apr. 27, 1976

[54] FASTENER FOR LOCKING A ROTATABLE PART TO A SHAFT

[75] Inventor: Bertil Carlstrom, Stockholm, Sweden

[73] Assignee: ITT Industries, Inc., New York, N.Y.

[22] Filed: Jan. 31, 1974

[21] Appl. No.: 438,205

Related U.S. Application Data
[63] Continuation of Ser. No. 263,990, June 19, 1972.

[30] Foreign Application Priority Data
June 18, 1971  Sweden............................... 7921/71

[52] U.S. Cl. ............................... 403/258; 403/320; 403/362
[51] Int. Cl.² ........................................... F16D 1/06
[58] Field of Search .......... 403/320, 362, 258, 259; 151/24, 41.74, 70, 14 R

[56] References Cited
UNITED STATES PATENTS

| | | | |
|---|---|---|---|
| 538,309 | 4/1895 | Wood........................... | 151/70 UX |
| 889,894 | 6/1908 | Berentsen.............................. | 403/7 |
| 1,474,239 | 11/1923 | Collins.............................. | 151/24 X |
| 1,845,428 | 2/1932 | Llewellyn........................... | 151/14 R |
| 2,384,177 | 9/1945 | Kent........................ | 151/5 |
| 2,396,276 | 3/1946 | Lang................. | 85/23 UX |
| 2,993,714 | 7/1961 | Junghanns........................ | 403/279 |
| 3,016,077 | 1/1962 | Yocum................................. | 151/70 |

FOREIGN PATENTS OR APPLICATIONS

| | | | |
|---|---|---|---|
| 377,338 | 12/1939 | Italy....................................... | 151/24 |
| 788,871 | 1/1958 | United Kingdom................... | 151/70 |

*Primary Examiner*—Andrew V. Kundrat
*Attorney, Agent, or Firm*—J. B. Raden; D. P. Warner

[57] ABSTRACT

A device is disclosed for locking a first screw, or other rotatable part, within a cavity in an impeller. The screw incorporates a cavity containing a spring. A second screw is positioned in the head of the first screw in such a way that it may be used to force the spring into resilient cooperation with the surrounding surface. The first screw is locked thereby to the surrounding surface and is prevented from threading-out under certain heavy load conditions. This development is especially useful for locking an impeller to a pump shaft.

6 Claims, 3 Drawing Figures

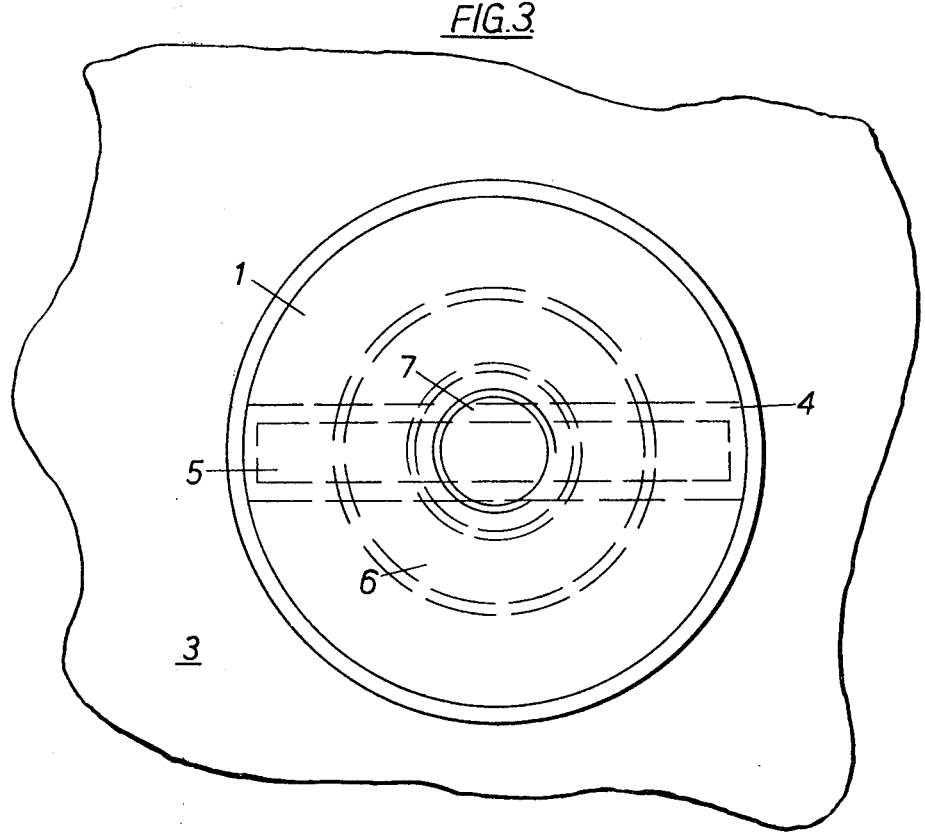

FASTENER FOR LOCKING A ROTATABLE PART TO A SHAFT

This is a continuation of application Ser. No. 263,990 filed June 19, 1972.

BACKGROUND OF THE INVENTION

1. Field of the Invention

The present invention relates to fastening means for locking a turnable part, such as a screw, within a cylindrical cavity. It has particular application to the fastening of pump impellers and the like to drive shafts.

2. Description of the Prior Art

In order to attach a pump impeller to a shaft, the shaft and the impeller are provided with wedge-shaped grooves so that the impeller is unturnable relative to the shaft. In order to prevent the impeller from sliding off the shaft, a screw having a head larger in diameter than the shaft may be threaded into the shaft end. The screw is generally threaded so that when the shaft rotates, the screw strives to thread further in. If, however, a large object comes into the impeller which prevents it from rotating, it is possible that instead the screw may be threaded out, which may cause the impeller to come loose. This result may also be caused by vibrations in the pump.

In order to eliminate these risks, different types of screw locks have been applied such as jam nuts and the like. Jam nuts, however, have the disadvantage that they must be made relatively wide in order to permit necessary tightening force to be applied. Therefore, they encroach on the space in the impeller which may make an object in the pumped medium get caught.

Another way to provide a lock is by threading a screw into the shaft end. However, such a screw is difficult to loosen, which must be done in order to change the impeller and to perform other services on the pump.

The problems with locking are especially difficult in pumps of large size, where strong acceleration-retardation and vibration forces appear.

SUMMARY OF THE INVENTION

The problem of securing an impeller to a shaft by a safe and at the same time easily detachable joint is solved according to the invention by use of a rotatable part (a main screw) having a cavity within which locking means is positioned. The locking means is in the form of a spring which may be forced by a secondary screw threaded into the main screw into resilient cooperation with a surface outside the main screw. Thereby, a lock between the turntable part (the main screw) and a surface outside the part (e.g. the internal surface of an impeller) is obtained.

By means of this approach, the lock becomes more effective as stronger forces are applied to the device.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which:

FIG. 3 is a view in an axial direction of the device showing it unlocked.

DESCRIPTION OF PREFERRED EMBODIMENTS

In the Figures, 1 stands for the turnable part (the main screw), 2 the internal cylindrical surface of the device (the impeller), 3 the impeller or other device which surrounds the screw 1, 4 a cavity in the screw 1, 5 a spring arranged in this cavity and 6 the shaft on which the impeller is put and in which the screw 1 is threaded. The impeller 3 is fixed in position relative to the pump shaft 6. The impeller is prevented from sliding off the shaft by the screw 1, which is threaded into the shaft.

Figure 1:
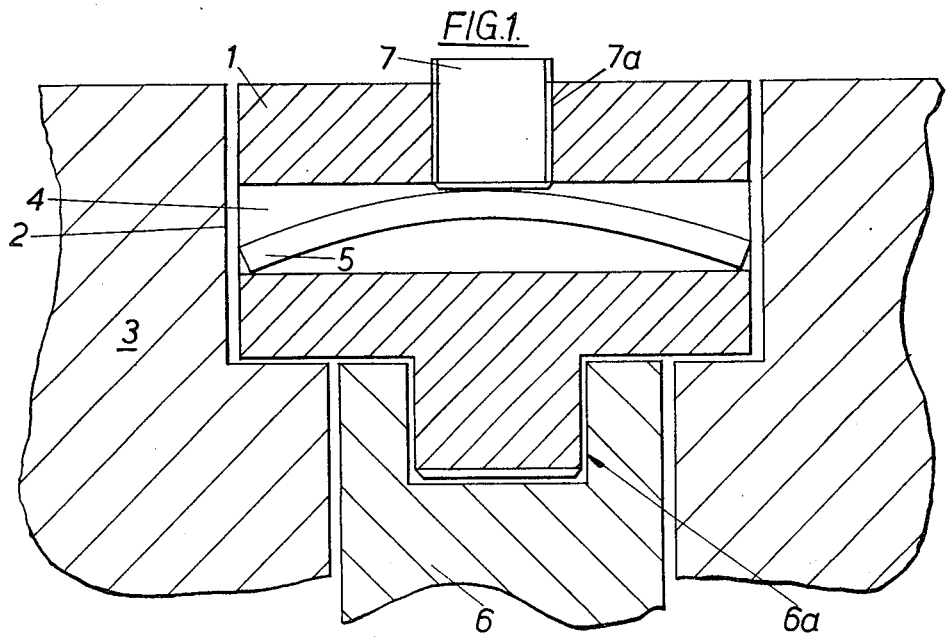
FIG. 1 is a sectional view showing the locking device in an unlocked position.
Figure 2:
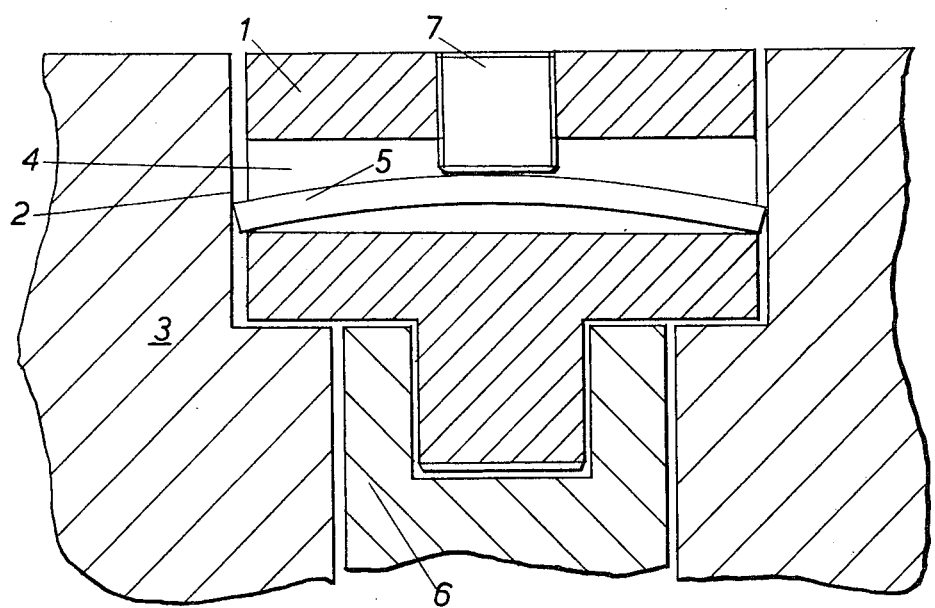
FIG. 2 is a sectional view showing the locking device in a locked position.

In order to prevent the screw 1 from threading out, the spring 5 is arranged in the cavity 4. By threading in the other screw 7, the spring is straightened out and forces its way somewhat into the surface 2, as shown in FIG. 2. The screw 1 will thereby be locked to the shaft 6.

When the impeller must be removed for service, the screw 7 is loosened, the spring 5 returns to its original curved shape whereby its ends lose their contact with the surface 2. The screw 1 can then be threaded out of the shaft 6 and the impeller 3 can be loosened. Because of the spring force even the screw 7 will be locked and prevented from coming loose, when the device is in locked position.

According to the invention a safe but at the same time simple and easily detachable locking of an impeller to a shaft is obtained. However, the invention is not bound to the above described embodiment. It is applicable in general to locking of a nut by locking of a turnable part to the surroundings.

I claim:

1. Fastening means for releasably locking a first rotatable part within the walls of a cylindrical opening in a device comprising:

a first rotatable part adapted to be positioned within the walls of a substantially smooth-walled cylindrical opening in a power transmitting device, a cavity within the first rotatable part, said cavity extending through the first rotatable part from a first opening to a second opening in the part to provide a passageway through the part along a diameter of the part, resilient means in the form of a curved spring loosely positioned within said cavity and shaped to be removable through one of said openings, a threaded opening in said first rotatable part which provides a third opening into said cavity, a second rotatable part in threaded engagement within the threaded opening in said first rotatable part, said second rotatable part terminating in an end surface integral therewith to engage the resilient means, said second rotatable part responding to the application of a rotary force to rotate in said threaded opening and to press said surface against said resilient means, said resilient means responding to pressure from said second rotatable part to straighten the curved spring in said cavity causing it to cooperatively engage the substantially smooth walls of the cylindrical opening in the device and thereby enable the first rotatable part to be locked to the device in an arbitrary axial position and an arbitrary turntable position relative to the walls of the opening, said second rotatable part being easily turned to release said resilient means and unlock the first rotatable part from the device.

2. The invention according to claim 1, in which the first rotatable part is a first screw, the device is an impeller, and the first screw is threaded into a shaft to lock the impeller to the shaft.

3. The invention according to claim 1, in which the first rotatable part is a fastener, the fastener includes a first portion having a substantially smooth outer periphery to fit within said smooth-walled cylindrical opening and a second portion of smaller diameter which is threaded to fit a threaded opening in a drive shaft, and said second rotatable part is a fastener completing a releasable coupling between said device and the drive shaft when it forces the resilient means to engage the cylindrical opening.

4. Fastening means for releasably locking a first screw within the walls of a cylindrical opening in an impeller and locking the impeller to a shaft comprising:

a first screw threaded into a shaft and extending into position within the walls of a substantially smooth-walled cylindrical opening in the impeller, a cavity within the first screw, said cavity extending through the first screw from a first opening to a second opening in the screw to provide a passageway through the screw along a diameter of the screw, a curved spring loosely positioned within said cavity and shaped to be removable through one of said openings, a threaded opening in said first screw which provides a third opening into said cavity, a second screw in threaded engagement to the threaded opening in said first screw, said second screw terminating in a surface integral therewith to engage the curved spring, said second screw responding to the application of a rotary force to rotate in said threaded opening and to press said surface against said curved spring, said curved spring responding to pressure from said second screw to cooperatively engage the substantially smooth walls of the cylindrical opening in the impeller and thereby enable the first screw to be locked to the impeller in an arbitrary axial position and an arbitrary turnable position relative to the walls of the opening, said second screw being easily turned to release said curves spring and unlock the first screw from the impeller.

5. The invention according to claim 4, in which the curved spring is straightened out by contact with the second screw and ends of the spring are forced into contact with the cylindrical walls of the impeller.

6. The invention according to claim 5, in which the spring by its spring force locks the two screws into position relative to each other.

* * * * *